No. 805,503. PATENTED NOV. 28, 1905.
H. O. TRAUN.
VULCANIZING HARD RUBBER ARTICLES HAVING INTERIOR CAVITIES.
APPLICATION FILED APR. 13, 1905.
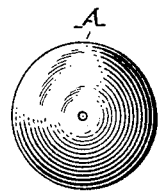
Attest:
RW Ashley
Sophie M. Barder
Inventor:
H. O. Traun
by Oscar F. Gunz his Atty.

UNITED STATES PATENT OFFICE.

HEINRICH OTTO TRAUN, OF HAMBURG, GERMANY.

VULCANIZING HARD-RUBBER ARTICLES HAVING INTERIOR CAVITIES.

No. 805,503.　　　　Specification of Letters Patent.　　　　Patented Nov. 28, 1905.

Application filed April 13, 1905. Serial No. 255,395.

*To all whom it may concern:*

Be it known that I, HEINRICH OTTO TRAUN, a citizen of Germany, residing at Hamburg, Germany, have invented certain new and useful Improvements in Vulcanizing Hard-Rubber Articles Having Interior Cavities, of which the following is a specification.

This invention relates to improvements in vulcanizing hard-rubber articles having interior cavities.

In vulcanizing hard-rubber articles having interior cavities the air contained in these cavities is heated, and thereby expands, whereby the outer walls of the articles are apt to be ruptured by the expanding air, and to prevent this it has been customary heretofore to provide an opening through which the air in the cavity could escape; but this opening had to be of considerable size, so as to prevent closing of the same during the vulcanizing process, thus leaving a hole in the wall of the article, and this hole had to be filled and closed after the vulcanizing was completed. This not only consumes time and increases the cost of manufacture, but also prevents giving the article a perfect finish and mars the appearance of the same.

The object of this invention is to provide means whereby an opening of sufficient size is formed which is not closed by the vulcanizing process and is so small in the completed article as not to require any subsequent trimming or finishing and is not conspicuous in the completed article.

In the accompanying drawings, in which like letters of reference indicate like parts in both the figures, Figure 1 is a vertical longitudinal sectional view of a vulcanized hard-rubber article having an interior cavity and provided with a vent according to my invention. Fig. 2 is an exterior view of the vent.

The hollow article A is held between the two layers of tin-foil forming a mold B, and a small tube of hard rubber C is inserted through the rubber walls of the article and through the tin-foil before vulcanizing in such a manner that one end of this tube is in communication with the cavity D and the other end of the tube projects beyond the tin-foil, thus permitting the expanded air in the interior of the cavity to escape through said tube. This tube remains in the mass of rubber during the process of vulcanizing and by the vulcanizing is thoroughly incorporated and united with the mass of rubber being vulcanized. After the vulcanizing has been completed it is only necessary to cut and trim off that end of the tube projecting beyond the surface of the article, so that only the small bore of the tube appears on the surface of the article, and this bore is so small and insignificant that it can hardly be discovered with the naked eye, and thus does not mar the appearance of the article. The tube is preferably always made of the same material of which the article is to be made and also is to have the same color, so as to show as little as possible; but of course the tube may be made of other material, if so desired. The small bore of this tube is sufficient to permit the escape of all the air under pressure from the cavity, and it does not collapse during the vulcanizing process, and there is no danger of the vent being closed during the vulcanizing, as would occur if an opening of only sufficient size for the escape of the air were left in the mass of material.

Having described my invention, what I claim as new, and desire to secure by Letters Patent, is—

1. A vulcanized hard-rubber article, having an interior cavity, and a tube extending from the outer surface of said article into said cavity, which tube is also made of hard rubber and is integral with the said article, substantially as set forth.

2. The improvement in the art of making vulcanized articles having interior cavities, consisting in incorporating with the unvulcanized material before vulcanizing, a tube which extends from the interior cavity to the outer surface of the mold, in which the vulcanizing takes place, incorporating said tube with the article by the vulcanizing process and cutting off the exteriorly-projecting end of said tube, substantially as set forth.

In testimony whereof I have signed my name to this specification, in the presence of two subscribing witnesses, this 21st day of March, 1905.

HEINRICH OTTO TRAUN.

Witnesses:
　ERNEST H. L. MUMMENHOFF,
　IDA CHR. HAFERMANN.